March 1, 1966 F. SAUTIER 3,238,037
ARTIFICIAL MAGNETIC OXIDES
Filed Nov. 13, 1961
2 Sheets-Sheet 1
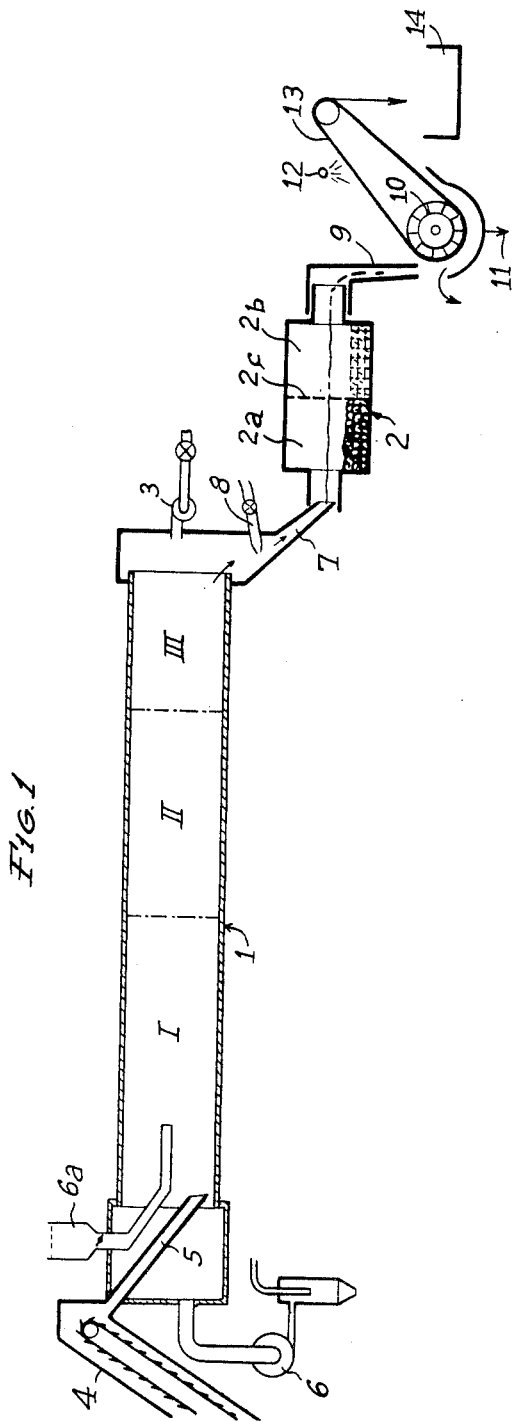

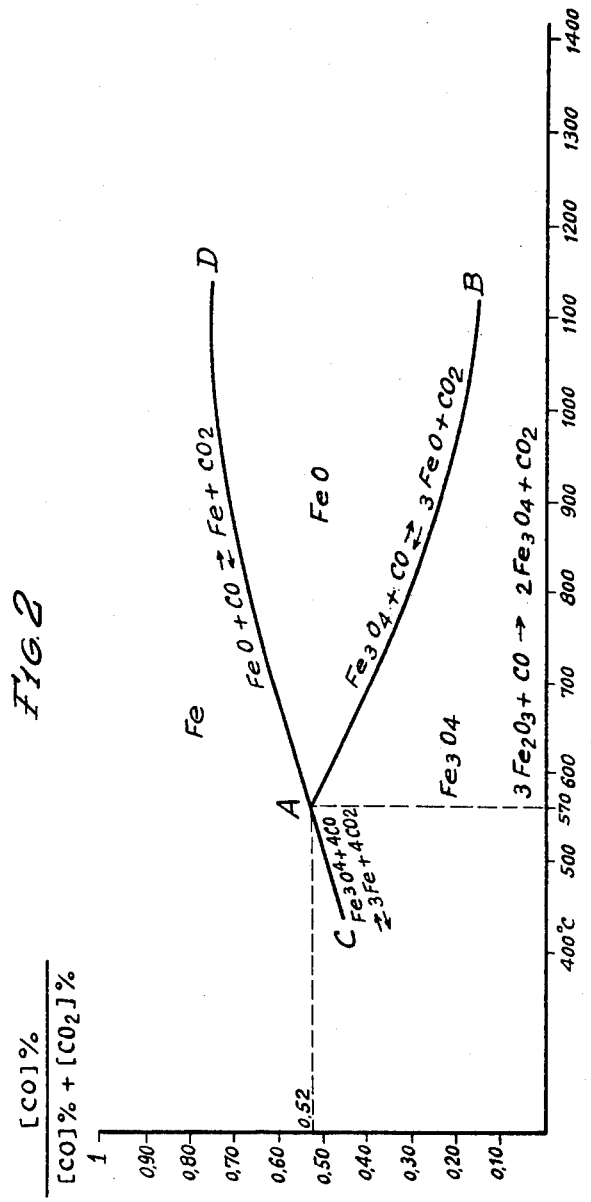

United States Patent Office 3,238,037
Patented Mar. 1, 1966

3,238,037
ARTIFICIAL MAGNETIC OXIDES
Francis Sautier, Fontainebleau, France, assignor to Societe Anonyme dite: Les Oxydes Francais, Paris, France
Filed Nov. 13, 1961, Ser. No. 151,856
Claims priority, application France, Nov. 14, 1960, 843,787, Patent 1,279,983
5 Claims. (Cl. 75—1)

The present invention relates to artificial magnetic iron oxides intended for preparing "dense liquors," and methods for preparing these oxides from non-magnetic iron ores.

The "dense liquors" are suspensions of dense solid substances in water, used in plants for purifying coal or the gravimetric enrichment of ores. In such a plant, the substance to be treated is immersed in the dense liquor the density of which has been so adjusted that a densimetric separation can take place between the lighter portion and the heavier portion thereof. The lighter portion, which floats on the surface, and the heavier portion, which sinks in the dense liquid are separately collected and first drained on a sieve and are then subsequently rinsed by spraying. A non-diluted liquor which can be directly recycled in the installation is thus obtained in the draining stage, and in the rinsing stage there is obtained a very dilute liquor which can be concentrated.

Dense liquors, the density of which can go up to a value of 2.5, can be prepared from these ferromagnetic oxides, with the appreciable advantage that these ferromagnetic oxides may be easily recovered by magnetic separation from the rinsing water collected in the aforementioned gravimetric treatment and separated from the sludge and clays entrained by the rinsing waters.

The solid magnetic product intended for the preparation of these dense liquors must meet certain essential characteristics as follows:

(1) *Magnetic Characteristics.*—The product for the dense liquor must have a very strong magnetic attraction. (The specifications lay down this quality by the measure of permeability which is a direct function thereof. The relative magnetic permeability is measured by the deflection of a galvanometer placed in the circuit of an inductance bridge the unbalance of which is measured by the introduction of the specimen to be examined into a branch of the bridge. The permeability is specified relative to a standard shown by a specified weight of a natural magnetic powder in the absolutely pure state and the same granularity. The permeability characteristics must have a minimum of 98% in relation to the standard.)

Taking into account the forces opposed to magnetic attraction during recuperation on the recuperating devices (tearing force, distance, loading of the liquor by ultra-fine sludge or clay, foreign bondies) the attractability of the particles of a dimension of 20 microns should still be integral in a field of 80 gauss at a distance of 100 metres and in a liquid current flowing at a speed of 0.20 m. per second.

Furthermore, the content of highly magnetic material in the product for dense liquid should not be below 95%.

(2) *Densimetric Characteristics.*—The products should have a density of at least 4.6 so that liquids can be prepared having a density of up to 2.5.

(3) *Granulometric Characteristics.*—The granularity of the magnetic product according to the needs and type of apparatus for treating minerals, should always be such that the following triple compromise may be observed:

(a) A fine grinding capable of giving a stable suspension in water;

(b) A granulometric distribution calculated according to a minimum loading of the particles of the product in the liquor, in order that too heavy a thickening of this liquor be avoided;

(c) No ultra-fine particles below 2 microns and no more than 10% of particles smaller than 10 microns. These very fine particles are not easily recovered under the aforementioned conditions, and their presence corresponds to an increase of losses in the magnetic recovery.

(4) *Hardness and Non-friability.*—The grains of magnetic material suspended in water, should moreover show characteristics of non-friability and wear resistance; the curve of the granulometric distribution of the said material should not be substantially modified when this material, suspended in water in the form of a liquid with a density of 1.5, is submitted to a non-friability test; the displacement of the various segments should not be modified by more than 5% after 120,000 passages of the material at a speed of 0.50 m./second, in a pump rotating at 300 r.p.m.

(5) *Form of the Particles.*—The particles of the magnetic product should be neither acicular nor foliated.

Until now these characteristics could only be obtained with natural magnetites.

We have now discovered that strongly magnetic iron oxides can be obtained artificially, said excess possessing the aforementioned characteristics, for preparing dense liquors from non-magnetic or barely magnetic iron ores, containing impurities, the melting point of which is much higher than that of the iron oxides, such as silica, alumina, etc., in the combined state or closely associated with iron oxides in their micro-crystalline structure.

To this end, the process according to the invention, comprises on the one hand, a traditional preparatory magnetising roasting treatment, under temperature and reduction ratio conditions given by the Chaudron diagram (which can be found in "Enrichissement des Minerais de fer" (Enriching Iron Ores) by L. Coche, page 49, 1954 edition) in order to reduce the part of iron oxides in their free state which are contained in the ore, to magnetic iron oxides and, at the same time, to eliminate volatile impurities such as the water of crystallisation, sulphur, carbon dioxide, etc., and on the other hand, the treatment proper of the portion of impure ore; said treatment being intended to liberate the iron oxides from the impurities such as silica, alumina, etc., with which they are combined or closely associated and to reduce the iron oxides as they are liberated in order to transform them to ferromagnetic oxides.

According to a first feature of the invention this treatment proper is carried out at a temperature which is at least equal to the temperature of agglomeration by calcination, or early fusion of the iron oxides, preferably below the melting point of silica, aluminia, and other impurities, the melting point of which is much higher than that of iron oxides, in such a way that the ionic bonds are released and a thermal agitation, and a modification of the micro-crystalline structure favouring the separation and expulsion of the impurities which were initially combined or associated with the iron oxides, is obtained.

According to the nature of the ore, this treatment temperature can vary between approximately 1250° C. and 1450° C.; the treatment time at this temperature is approximately 18 minutes.

According to a second feature of the invention, this thermal treatment proper can be carried out in a reducing atmosphere comprising a mixture of CO and $CO_2$, with a reduction ratio $$\frac{[CO]\%}{[CO]\% + [CO_2]\%}$$

which is at least equal to 0.95, a condition necessary to liberate the iron oxides of the combined impurities such as silica, aluminia, etc. and to avoid the recombination of these compounds. The iron oxides released are reduced in these conditions of temperature and reduction ratio to ferromagnetic oxides.

According to a third feature of the invention, this treatment proper is carried out in the presence of water vapour which is quantitively at least equal to 50% by weight of the iron, calculated as metal, contained in the ore treated in order to avoid an over-reduction of the iron oxides beyond the state of ferro-magnetic oxides.

During the preparatory magnetising roasting treatment, the portion of iron oxides in the free state which is contained in the ore is reduced to ferromagnetic oxides with a cubic crystalline structure.

It would appear that during the treatment proper, these ferromagnetic oxides, safeguarded against over-reduction by the presence of water vapour, form condensation nuclei whereon the iron oxides, which have been released and reduced to ferromagnetic oxides in the course of their formation, agglomerate by calcination in order to give nodules measuring from 1–10 mm., in which the scorified impurities exist only in the state of inclusions in the interstices, which are easily releasable by a subsequent mechanical treatment. These nodules making it possible subsequently to obtain particles with a shape and hardness corresponding to the required characteristics.

The peripheral layer of the nodules may be constituted of Wustite ($FeO + Fe_3O_4$) of low magnetic power and non-magnetic FeO in the event that they had not been reoxidised to ferromagnetic oxides by the water vapour.

According to another feature of the invention, the treatment proper is followed by an abrupt cooling which cools the material to a temperature of about 250° C. To this end the calcinated nodules, in the pasty state, are projected, out of contact with air into a closed crusher containing water at 100° C. The dimensions of the crusher and the quantity of water should be sufficient for nodules of from 1–10 mm. to be simultaneously reduced to nodules below 1 mm., and cooled to approximately 250° C. The cooling and reduction time of the dimension of the nodules should not exceed 1 second.

The aim of this operation is:

To fix the microcrystals fused in very hard calcinated nodules measuring from 0–1 millimetres by hardening;

To fix the atomic magnets in parallel orientation corresponding to the magnetisation characteristics desired, in such a way that the magnetic characteristics are, henceforth indefinitely stable to temperatures used;

To harden the calcinated nodules and obtain the desired resistance to friability;

To obtain, by subsequent crushing, particles corresponding in shape to the desired rheological qualities and granulometric distribution;

To expel impurities by crushing and dilution before total hardening of the material, in such a way as to avoid that they be again sequestered in the micro crystalline structure; and To obtain the desired density.

After completing the crushing to the desired granularity, the impurities are separated by passing the material obtained through a magnetic separator which retains only the latter.

The invention will be better understood by reference to the following description of an embodiment of the process according to the invention. FIG. 1 of the annexed drawings is a diagram of an installation which could be used for the treatment according to the invention. FIG. 2 of the annexed drawings is a Chaudron diagram.

With reference to the drawing, the treatment according to the invention is carried out in a horizontal rotatable furnace 1 the exit of which communicates with a ball mill 2. The heating of this oven and the controlled production of the reducing mixture, $CO_2$, are assured by fuel burners 3. The ore to be treated, for example a roasting residue of pyrite, which has been previously crushed and melted to a grain size of 0 to 10 mm., is fed by an elevator 4 and introduced to the entrance of the furnace by a chute 5. A ventilator 6 ensures the drawing and elimination of the combustion gases, and an adjustable air intake 6a can be provided if necessary.

On the inside of the furnace the ore proceeds in a preparatory treatment zone I by being progressively heated to a temperature of 600° C. in a reducing atmosphere with a reduction ratio of around 0.1.

At the end of this zone, the material passes through an intermediary zone II where its temperature is progressively increased to 1250° C. in a reducing atmosphere, the reduction ratio of which is progressively increased to 0.85. This preparation lasts 25 minutes approximately. In the last zone III the material is kept at 1250° C. at a reduction ratio of around 0.85. A quantity of water vapour equal to 20 to 25% by weight of the ore is fed into this zone III. Treatment in this latter zone lasts approximately 18 minutes.

The nodules of ferromagnetic oxide, with a grain size of from 1 to 10 mm. for example, obtained by calcination as described above, are subsequently discharged by chute 7 into the ball mill 2. Simultaneously, the quantity of water necessary to temper the nodules and to produce adequate water vapour is introduced through nozzle 8.

The addition of water is at such a rate that, on the one hand, a proportion of ferromagnetic oxides/water of 1/1000 prevails and, on the other hand, that the evaporation and loss of water eliminated with the ferromagnetic oxides by the evacuation chute 9 is compensated and that the level of the water in the mixer is maintained at a suitable height. As soon as the material in the state of pasted calcinated nodules comes into contact with the water, it is abruptly cooled to 250° C. in less than one second. In the same length of time the nodules are reduced to a size of 0 to 1 mm. by the action of the balls in the compartment 2a of the crusher in order to ensure that cooling takes place at the centre, as well as ensuring the elimination and dilution of impurities before total hardening of the ferromagnetic oxides.

The nodules then pass through the separation grids 2c into compartment 2b of the crusher where crushing to the required granulometric distribution is completed and where the impurities contained in the anfractuosities are released.

The crushed material, diluted in water in which the impurities are dispersed, leaves the crusher by chute 9 and is discharged on to a magnetic separator 10 of the drum type. The non-magnetic impurities fall into container 11 and are eliminated with the water. Rinsing clarinets 12 discharge clear water on to the concentrated ferromagnetic oxides brought up on belt 13. This water is also eliminated with the impurities in 11.

The purified and concentrated ferromagnetic oxides are then discharged into a storage tank 14.

The artificial ferromagnetic oxides intended for dense liquors thus obtained show the following characteristics:

(1) *Crystallographic form.*—The structural and chemical examination of artificial ferromagnetic oxides for dense liquor obtained by the process according to the invention show the following changes in characteristics, in relation to the initial characteristics of the ore:

The spectrogram of X-rays (rays $K\alpha$ of copper) reveal that the artificial ferromagnetic oxides are bodies crystallised in the cubic system with the exception of a very low proportion of $\alpha$-rhombohedral $Fe_2O_3$, indistinguishable on the spectrogram.

(2) *Structural composition.*—The thermo-magnetic analysis reveals that in this structure the different iron oxides are distributed in the following proportion:

| | Percent |
|---|---|
| $Fe_3O_4$ | 60 |
| $\gamma$-$Fe_2O_3$ | 25 |
| $\alpha$-$Fe_2O_3$ | 3 |
| FeO | 2 | to which should be added the following metal combinations:

Silicon, aluminum copper, nickel, barium, in the form of combined magnetic ferrites _____ 5
— 95

Non-magnetic impurities _____ 5

The impurities which remain combined to the iron oxide structure such as copper, nickel, barium, are generally the heavier and add to the densification of the artificial ferromagnetic oxides without modifying the desired magnetic characteristics.

(3) *Chemical analysis.*—The compared chemical analysis of the initial ore and the artificial ferromagnetic oxides for dense liquors obtained according to the invention, show the following content differences:

EX PRESSED IN OXIDES

| Denomination | Residue of roasting of pyrite, percent | Artificial ferromagnetic oxides for dense liquor, percent |
|---|---|---|
| $SiO_2$ | 8 | 3.2 |
| $Al_2O_3$ | 16 | 5.5 |
| CaO | 0.6 | |
| BaO | 0.3 | 0.31 |
| ZnO | 1.8 | 0.32 |
| CuO | 0.45 | 0.51 |
| $SO_3$ | 2 | 0.16 |
| $Fe_2O_3$ | 64 | |
| Cubic ferrites | | 90 |

RELATIONSHIP IN METAL

| | | |
|---|---|---|
| Silicon | 3.72 | 1.47 |
| Aluminum | 7.68 | 3.68 |
| Calcium | 0.42 | |
| Barium | 0.27 | 0.27 |
| Zinc | 1.47 | 0.25 |
| Copper | 0.39 | 0.40 |
| Sulfur | 0.80 | 0.06 |
| Iron | 44.80 | 64.96 |

(4) *Magnetic properties.*—The measurement of magnetic properties demonstrates that the product obtained according to the invention possesses the strong lasting magnetic characteristics desired.

(5) *Density.*—The density of 3.5 for the ore has risen to 4.8 for the artificial ferromagnetic oxides for dense liquors.

An analogous product can be obtained from a carbonaceous iron ore at a treatment temperature proper of 1350° C. approximately, or of a hematite ore wtih a treatment temperature proper of approximately 1450° C. instead of the roasting residues of pyrite.

What is claimed is:
1. Process of producing ferromagnetic oxides which comprises:
   Step. 1: treating the residue from the roasting of pyrite, having an initial grain size not exceeding 10 mm., under the temperature and reduction conditions given in the Chaudron diagram thereby to form ferromagnetic iron oxide;
   Step 2: subjecting the product of Step 1 to a temperature of 1250–1450° C. in a reducing-oxidizing atmosphere of CO and $CO_2$ with a reduction ratio of at least 0.85, in the presence of steam in an amount of at least 50% by weight of that of the iron contained in the iron ore;
   Step 3: abruptly cooling and simultaneously crushing the nodular product of Step 2 out of contact of air in a closed crusher containing water at 100° C., while water is added thereto at a rate to maintain a proportion of ferromagnetic oxide/water of 1/1,000, whereby the nodules are simultaneously reduced in size and cooled to approximately 250° C. in less than one second.

2. Process in accordance with claim 1 followed by a final crushing of the particles to the granulometric distribution as follows: maximum particle size, 1 mm., no ultra-fine particles under 2 microns, and no more than 10% of the particles smaller than 10 microns; and magnetically separating the ferromagnetic oxides therefrom.

3. Process in accordance with claim 1 wherein the temperature in Step 1 is about 600° C. and the reduction ratio is about 0.1.

4. Process in accordance with claim 1 wherein the particles of Step 3 are further crushed to yield crushings devoid of ultra-fine particles of less than 2 microns and containing no more than 10% of particles having a size of less than 10 microns; and magnetically separating the ferromagnetic oxides therefrom.

5. A ferromagnetic oxide as obtained by the method of claim 1.

References Cited by the Examiner

UNITED STATES PATENTS

| 2,204,576 | 6/1940 | Davis | 75—1 |
| 2,528,552 | 11/1950 | Royster | 75—1 |
| 2,528,553 | 11/1950 | Royster | 75—1 |
| 2,944,884 | 7/1960 | Halvorson | 75—1 |
| 3,105,757 | 10/1963 | Peras | 75—1 |

FOREIGN PATENTS 470,779  8/1937  Great Britain.

DAVID L. RECK, *Primary Examiner.*

BENJAMIN HENKIN, *Examiner.*

N. F. MARKVA, *Assistant Examiner.*